United States Patent [19]

Yasukawa et al.

[11] E Re. 29,327

[45] Reissued Aug. 2, 1977

[54] METHOD AND APPARATUS FOR CORRECTING TIME IN AN ELECTRONIC WRISTWATCH

[75] Inventors: Hideaki Yasukawa; Okito Naito, both of Suwa, Japan

[73] Assignee: Kabushiki Kaisha Suwa Seikosha, Tokyo, Japan

[21] Appl. No.: 715,478

[22] Filed: Aug. 18, 1976

Related U.S. Patent Documents

Reissue of:

[64] Patent No.: 3,889,460
Issued: June 17, 1975
Appl. No.: 371,084
Filed: June 18, 1973

[30] Foreign Application Priority Data

June 19, 1972 Japan ..... 47-61101

[51] Int. Cl.[2] ..... G04C 3/00; G04B 19/38; G04B 27/00

[52] U.S. Cl. ..... 58/23 R; 58/50 R; 58/85.5

[58] Field of Search ..... 58/23 R, 50 R, 85.5

[56] References Cited

U.S. PATENT DOCUMENTS

| | | | |
|---|---|---|---|
| 3,643,418 | 2/1972 | Polin et al. | 58/85.5 X |
| 3,672,155 | 6/1972 | Bergey et al. | 58/50 R |
| 3,733,810 | 5/1973 | Girard | 58/50 R X |

*Primary Examiner*—E. S. Jackmon
*Attorney, Agent, or Firm*—Blum, Moscovitz, Friedman & Kaplan

[57] ABSTRACT

An electronic timepiece having a pulse generator producing a high frequency time standard signal, a divider circuit formed from a plurality of series-connected divider stages for producing low frequency timing signals in response to said time standard signal and a device for displaying time in response to said timing signals, is provided with a correction circuit disposed in said divider circuit. The correction circuit enables the use of a new method and apparatus for providing a correction signal to the divider stages counting seconds to reset the divider stages to zero seconds during use of the watch, to thereby correct the accuracy of the second display.

6 Claims, 6 Drawing Figures

METHOD AND APPARATUS FOR CORRECTING TIME IN AN ELECTRONIC WRISTWATCH

Matter enclosed in heavy brackets [ ] appears in the original patent but forms no part of this reissue specification; matter printed in italics indicates the additions made by reissue.

BACKGROUND OF THE INVENTION

This invention relates generally to electronic timepieces incorporating digital displays, and in particular, to a method and apparatus for correcting the time displayed by electronic timepieces such as wristwatches. Electronic timepieces such as wristwatches have become known for their high accuracy and it is very common for such wristwatches to sustain an accuracy rate within plus and minus 30 seconds per month. Such accuracy rates will cause watches which include the display of seconds, a feature incorporated into very accurate timepieces, to display the wrong time. Normal time setting, such as during insertion of a new battery, in the timepiece, is generally limited to setting the hour and minute. Heretofore, the method of seconds correction during normal use entailed the holding of the second hand in a waiting position until the correct time was reached and then releasing the hand. Such a method required operating a switch two times and considerable waiting which renders such method less than completely satisfactory. Moreover, because wristwatches are limited in the space provided for electronic circuitry, correction circuitry which has been heretofore suggested, has not provided the accuracy and the minimal space displacement which is necessary in such watches. Accordingly, it is desirable to produce a small sized digital electronic timepiece, particularly a wristwatch which can be corrected by a simple method and apparatus which includes the addition of a correction signal to the counting circuit of the watch.

SUMMARY OF THE INVENTION

Generally speaking, in accordance with the invention, an electronic timepiece is provided including pulse generator means for generating a high frequency time standard signal, divider means formed from a plurality of series-connected divider stages for producing low frequency timing signals in response to said high frequency time standard signal and representative of present time, and digital display means for the digital display of time in response to said timing signals. A correction circuit is coupled to certain of said divider stages to apply a reset signal thereto.

A method for correcting the seconds display during normal use of the timepiece is provided when the seconds display is incorrect within a time period of plus and minus 30 seconds. Upon observing that the actual time is exactly at a minute indication, an operator provides a correction signal to certain of the divider stages which correspond to the display of seconds, the correction signal effecting the reset of such certain divider stages to zero seconds and the restarting thereof. Where the time displayed is slow by 1 to 30 seconds, application of the correction signal further effects an advancement of the minute display.

Accordingly, it is an object of the invention to provide a small-sized electronic timepiece provided with a digital display and having an improved correction circuit.

Still another object of this invention is to provide an improved small-sized electronic timepiece provided with an improved correction circuit and method for utilizing the same.

Still another object of the invention is to provide an improved method for correcting small-sized electronic timepieces.

The invention accordingly comprises several steps and the relation of one or more of such steps with respect to each of the others, and the apparatus embodying features of the construction, combination of elements and arrangements of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENT

Figure 1:
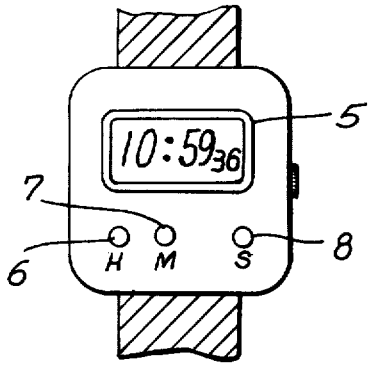
FIG. 1 is a perspective view of an electronic wristwatch constructed in accordance with the preferred embodiment of the instant invention.

Referring to FIG. 1, an electronic timepiece is illustrated therein and includes a digital display 5, for displaying the present time in terms of minutes, hours and seconds. The front of the watch further includes time setting switches 6 and 7 which enable setting and correction of the hours and the minutes digits respectively of display 5. Switch 8 is a time correcing switch used in the method and apparatus of the instant invention.

Figure 2:
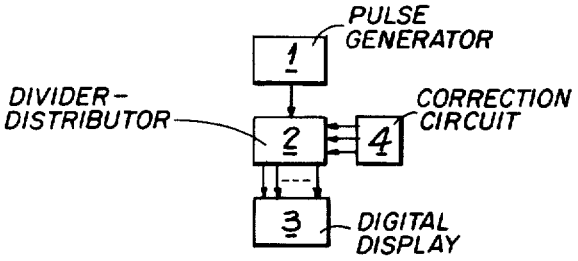
FIG. 2 is a block diagram of the circuitry of the electronic wristwatch illustrated in FIG. 1.
Figure 5:
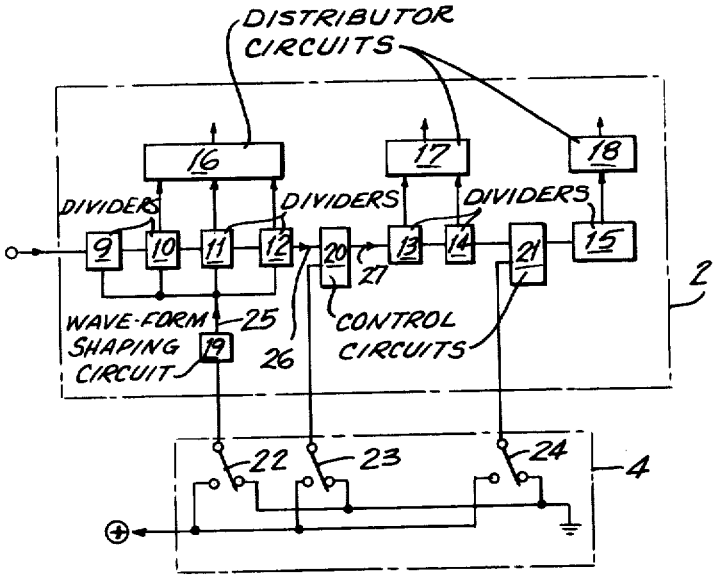
FIG. 5 is a circuit diagram including the correction circuit of the electronic timepiece of FIG. 1.

Referring now to FIGS. 2 and 5, the circuitry of the electronic timepiece of FIG. 1 is illustrated, including a pulse generator 1, which may take the form of a quartz crystal oscillator or the like. A high frequency time standard signal output of pulse generator 1 is applied to divider and distributor circuit 2 which includes a divider chain which divides the time standard signal into time keeping signals such as hours, minute, and second signals. The dividers of the divider chain producing the time keeping signals may be selectively corrected by means of correction circuit 4 including switches 6, 7 and 8. The instantaneous time-keeping signals are applied to distributor circuits which place them in a form for driving the respective digits of digital display 3.

As shown in FIG. 5, the divider chain of divider and distributor circuit 2 includes the divider circuits 9 through 15 each of which produces instantaneous timing signals counted therein for application to distributor circuits 16, 17 and 18 as will hereinafter be discussed. In the divider circuit depicted in FIG. 5, divider circuit 9 receives a high frequency signal such as would be supplied by the crystal oscillator and produces a 1-second signal having a period of 1 second. The 1-second signal from divider circuit 9 is then applied to a series chain of divider circuits 10 through 15 which produce timing signals for display. Thus, divider circuit 10 is a 1/10 divider circuit for producing a 10-second signal; divider circuit 11 is a ⅙ divider for producing a ½ minute signal; divider circuit 12 is a ½ divider for producing a 1-minute signal; divider circuit 13 is a 1/10 divider for producing a 10-minute signal; divider circuit 14 is a 1/6 divider circuit for producing a 1-hour signal; and divider circuit 15 is a 1/12 divider circuit for producing a 12 hour signal.

Divider circuits 10 through 15 supply instantaneous timing signals counted therein to distributors 16, 17 and 18 which correspond respectively to the second, minute and hour digits of the digital display, divider circuits 10, 11 and 12 being connected to distributor 16, divider circuits 13 and 14 being connected to distributor 17 and divider circuit 15 being connected to distributor 18.

The time correcting circuit 4 includes conventional time setting switches 23 and 24 which correspond to time setting switches 6 and 7 respectively of FIG. 1, and time correcting switch 22 which corresponds to switch 8 of FIG. 1. The time correcting switch 22 is coupled to a waveform shaping circuit 19 which in turn is coupled to divider stages 9 through 12. By application of a correction signal to divider circuit stages 9 through 12 by actuation of switch 22, a reset signal is supplied by the wave shaping circuit 19 to the divider stages to thereby reset the divider stages. Time setting switches 23 and 24 are coupled to control circuits 20 and 21 which control circuits shape the waveform of the time setting signal from switches 23 and 24 and the output or carry signal from the next previous divider stage and supply corrected carry signal to the next subsequent divider stage in response to the respective signals supplied thereto. Thus, control circuit 20 receives the carry signal from divider 12 and the correction signal from switch 23 and insures that the count of the signal applied to divider 13 is increased by one for each operation of switch 23 to effect correction of the minutes digits of the digital display. Correction of the hours digits is effected in a like manner by switch 24 and control circuit 21. Control circuits 20 and 21 are each adapted to produce a positive pulse of short duration for each positive excursion of the signals applied thereto.

Figure 3:
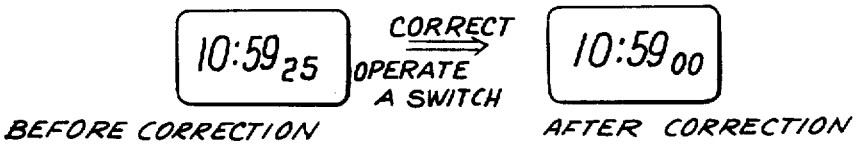
FIG. 3 is a perspective view of the digital display of the electron timepiece of FIG. 1 illustrating a first mode of correction.
Figure 6:
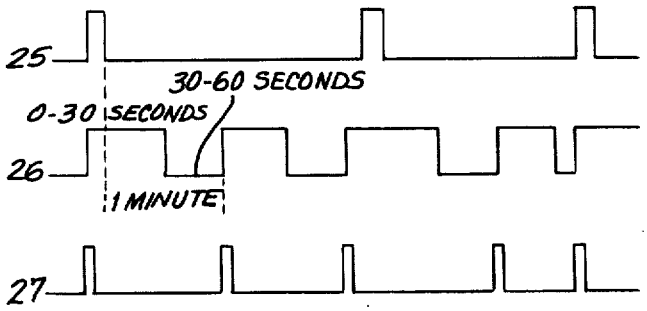
FIG. 6 is a wave diagram corresponding to the circuit of FIG. 5.

Reference is now made to FIG. 6 in which waveform 25 corresponds to the correction signal supplied from wave shaping circuit 19 to the divider stages 9 through 12; waveform 26 corresponds to the 1-minute signal supplied from divider circuit 12 to control circuit 20; and, waveform 27 corresponds to the output of control circuit 20 in the absence of any signals applied from time setting switch 23.

Where the error is plus or minus 30 seconds or less, there are two possible modes of correction using time correction switch 22, depending on whether the watch is running fast or slow. The first mode where the watch is fast is illustrated in FIG. 3, where the time before correction is 10 hours, 59 minutes and 25 seconds. An operator will use a standard reference source for telling time such as a radio, T.V. or telephone operator to aid in correcting the time. When the standard reference time is 10 hours, 59 minutes and 0 second, switch 22 is closed and a reset pulse is generated in wave shaping circuit 19 which is then supplied to divider stages 9 through 12, thus resetting each of said divider stages to zero. In this case, the reset signal 25 depicted in FIG. 6, is applied to divider stage 12 during a period (0–30 seconds) that the output is already positive so that resetting has no immediate effect on the output signal 26 of divider circuit 12. The width of the positive pulse of output signal 26 during which switch 22 is operated is increased since the count of seconds starts again from zero seconds. Thereafter, signal 26 resumes its normal 1-minute period. The next pulse of signal 27 from central circuit 20 is thus retarded by an amount sufficient to permit correction. The application of the reset signal at the proper time thus corrects the time from 10 hours 59 minutes and 25 seconds to 10 hours and 59 minutes and 0 seconds, and immediately restarts the timing signals so as to then provide normal use of the wristwatch.

Figure 4:
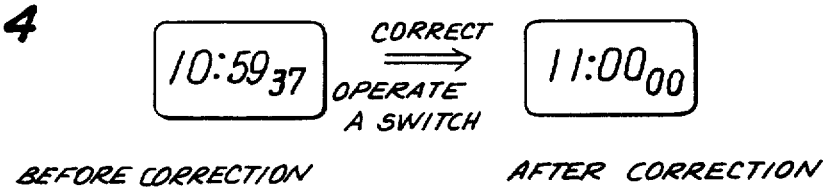
FIG. 4 is a perspective view of the digital display of the electronic timepiece of FIG. 1 illustrating a second mode of correction.

The second mode of operation for use when the watch is running slow by 30 seconds or less is illustrated with reference to FIG. 4. In this mode correction is effected when the seconds display reads above 30 seconds, at which time output signal 26 from divider stage 12 is negative. If a correction pulse 25 from wave-form shaping circuit 19 is applied to divider stages 9 through 12 to reset the divider stages during this period, the resetting stage 12 to zero makes the output signal 26 positive. The earlier than normal positive excursion of signal 26 produces a pulse out of control circuit 20 (in signal 27) to advance the minute display by one. Thus, the watch display as depicted in FIG. 4 shows a time of 10 hours 59 minutes and 37 seconds, and upon application of a correction signal by an operator corresponding to an 11 o'clock standards referenc time, the time on the watch will be corrected to 11 o'clock and the watch will continue to operate in a normal mode.

It is understood that time correction of a wristwatch in normal use is performed, and that electronic circuits can be easily produced which will consume a minimum of power, yet be miniature enough to be used in the small space displacement required in an electronic wristwatch. The use of C-MOS integrated circuitry will provide low power consumption and the requisite small size to such wristwatch components.

It will thus be seen that the objects set forth above, among those made apparent from the preceeding description, are efficiently attained and, since certain changes may be made in carrying out the above method, and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An electronic timepiece comprising oscillator means for producing a high frequency time standard signal, divider means for producing low frequency timing signals from said high frequency time standard signals including a plurality of series-connected divider stages, certain of said divider stages corresponding to seconds display, means for the digital display of time in response to said timing signals, said digital display means displaying at least seconds and minutes, said seconds divider stages providing a substantially square-wave output signal having a period of 1 minute to the next divider stage, and correction means for applying a reset signal to said certain divider stages which correspond to the incorrect time displayed, said correction means being adapted to set the second digital display to zero without affecting the minute digital display when said reset signal is applied to said certain dividers during the first half cycle of said output signal when the seconds digital display means is 30 or less and to set the second digital display to zero and increase the minute digital display by one when said reset signal is applied to said certain dividers during the second half cycle of said output signal when said seconds digital display read more than 30.

2. An electronic timepiece as claimed in claim 1, wherein said certain divider stages are a 1/6 divider stage corresponding to a 1-second display and $\frac{1}{5}$ and $\frac{1}{2}$ divider stages corresponding to a 10-second display.

3. An electronic timepiece as claimed in claim 2, wherein said correction means includes a wave shaping means for supplying said reset signal to said certain divider stages in the form of a pulse.

4. An electronic timepiece as claimed in claim 3, wherein said correction means includes a manually operated switch means coupled to said wave shaping means, for selectively causing the application of said pulse reset signal to said certain divider stages.

5. An electronic timepiece as claimed in claim 4, wherein a second manually operated switch means is coupled to said next divider stage to effect correction of the minutes display.

6. A method for correcting errors of minus 30 seconds or less in an electronic timepiece having oscillator means for producing a high frequency time standard signal, divider means for producing low frequency timing signals from said high frequency time standard signal including a plurality of series-connected divider stages, certain of said divider stages *including seconds divider stages* producing a square wave timing signal to the next divider stage and means for the digital display of time including at least [a seconds and] a minutes display in response to said timing signals, the method comprising the steps of, at the nearest correct minute indication, in response to the second half cycle of the square wave timing signals, resetting the *seconds* divider stages producing the *seconds* timing signals [associated with the digital display of seconds] to zero and increasing the count of the next divider stages producing timing signals associated with the digital display of minutes by one.

* * * * *